United States Patent [19]

Arimatsu

[11] Patent Number: 5,384,907
[45] Date of Patent: Jan. 24, 1995

[54] METHOD FOR CARRYING OUT SCISSORING -PROCESSING OF STROKE LETTERS IN A SCREEN DISPLAY

[75] Inventor: Masatomo Arimatsu, Tokyo, Japan

[73] Assignee: Fujitsu Limited, Japan

[21] Appl. No.: 250,343

[22] Filed: May 27, 1994

Related U.S. Application Data

[63] Continuation of Ser. No. 746,336, Aug. 16, 1991, abandoned.

[30] Foreign Application Priority Data

Aug. 18, 1990 [JP] Japan .................. 2-217843

[51] Int. Cl.⁶ .......................................... G06F 15/62
[52] U.S. Cl. .............................. 395/150; 395/134; 345/118
[58] Field of Search ............... 395/150, 134; 345/17, 345/118

[56] References Cited

U.S. PATENT DOCUMENTS

5,012,433  4/1991  Callahan et al. ............. 364/518
5,031,114  7/1991  Yamagami ..................... 364/518
5,040,130  8/1991  Chang et al. ................... 364/521
5,065,344  11/1991 Kishimoto et al. ............ 395/134

Primary Examiner—Heather R. Herndon
Assistant Examiner—J. Feild
Attorney, Agent, or Firm—Greer, Burns & Crain, Ltd.

[57] ABSTRACT

The desired size of a series of letters is found by cutting out only a portion within a frame surrounded by a predetermined frame line among image information formed by a series of stroke letters. A band frame is created having a predetermined width on both sides of the frame line, and it is determined whether or not each stroke letter is on the outside of the band frame on the band frame or on the inside of the band frame. Display processing is carried out such that, when the stroke letter is on the outside of the band frame, a display is inhibited; when the stroke letter is on the inside of the band frame, the display is kept intact, and when determined that the stroke letter is on the band frame, a scissoring processing is carried out to display the stroke letter on the screen of a display device.

1 Claim, 7 Drawing Sheets

STROKE LETTER

Fig. 3

SCISSORING WINDOW

Fig. 6(A)

METHOD FOR CARRYING OUT SCISSORING-PROCESSING OF STROKE LETTERS IN A SCREEN DISPLAY

This is a continuation of copending application Ser. No. 07/746,336, filed on Aug. 16, 1991, abandoned.

BACKGROUND OF THE INVENTION

1. Field of the Invention

The present invention relates to a display method for carrying out scissoring-processing of a stroke letter with a high speed window-display thereof.

2. Description of the Related Art

In recent years, a CAD (Computer Aided Design) system has been developed and is in the improvement stage for practical application. CAD centers on the multifarious design services in the electrical and mechanical manufacturing industries and its field of application is spreading.

In general, the CAD system is constituted by a host computer, a graphic display unit, a plotter and various input devices, and a basic software for activating these devices.

The CAD system is often used to output a character or letter formed by stroke data, that is, a stroke character or letter to a graphic display unit, thus displaying many kinds of information.

On the other hand, when a graphic form is displayed on a screen of a display unit, if the original graphic form is large, it is required to adapt a display method such that a range contained in the display screen is cut out, or a window is provided in a part of the display screen and a partial graphic form is cut out within the window.

A processing which cuts out a portion limited by a predetermined frame is referred to as scissoring processing and is generally used in the CAD system.

Means for interacting between a user and a system, that is, a man-machine-interface is regarded as of major importance nowadays in the CAD system. It is advisable to provide a technique to carry out the interaction more speedily and smoothly, and process a series of stroke letters very fast by scissoring to display a limited portion of a display on a graphic display unit.

In the prior art CAD system, when a stroke letter line is displayed, the series of stroke letters is regarded as a set of segments, and scissoring processing effects each segment, forming a series of letters. Then, displaying of the limited portion of the display is done.

Nevertheless, in the above conventional system, since a series of stroke letters is regarded only as a set of segments, there is a problem that scissoring processing must be carried out on each line segment forming a series of letters, and it takes an enormous amount of time to carry out this process.

In light of the above circumstances, the present invention has been devised.

SUMMARY OF THE INVENTION

It is an object of the present invention to provide a display system for effecting very fast scissoring processing enabling a display of a series of stroke letters on a graphic display unit.

In accordance with the present invention, there is provided a display method for cutting out only a portion within a frame surrounded by a predetermined frame line among image information formed by a series of stroke letters and displaying the limited portion of the display, said display method comprising the steps of:

creating a band frame having a predetermined width on both sides of said frame line;

determining whether or not said stroke letter is on the outside of the band frame produced by the step of creating the band frame, on the band frame or on the inside of the band frame, and carrying out a display processing such that, when it is determined that the stroke letter is on the outside of the band frame, a display is inhibited, when it is determined that the stroke letter is on the inside of the band frame, the display is carried out as kept intact, and when it is determined that the stroke letter is on the band frame, a scissoring processing is carried out to display the stroke letter on the screen of a display device.

PREFERRED EMBODIMENTS OF THE INVENTION

Figure 1:
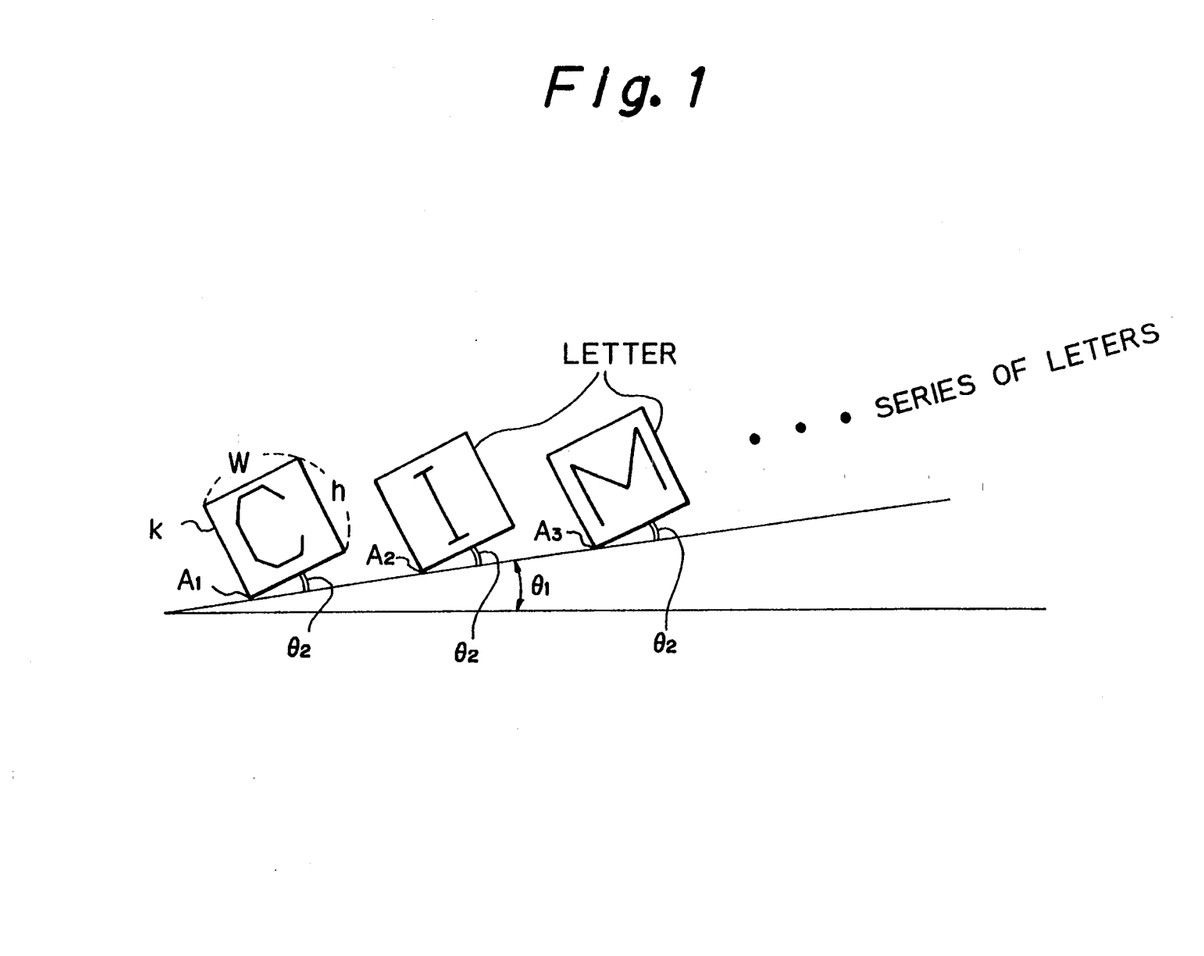
FIG. 1 is a drawing showing an example of a series of stroke letters to be processed in the present invention.

FIG. 1 is a drawing showing an example of a series of stroke letters to be treated in the present invention. Both series of letters and each letter illustrate a separate inclination.

In FIG. 1, an angle $\theta_1$ depicts an inclination of a letter line LL to the reference line R and an angle $\theta_2$ an inclination of each letter toward a straight line combining each left bottom point $A_i$ of the letter line CIM . . . . $A_i$ (i=1, 2, 3, . . . ) denotes a left bottom point of each rectangle k having a height h and a width w surrounding each letter and the point $A_i$ is called a letter reference point.

Figure 2:
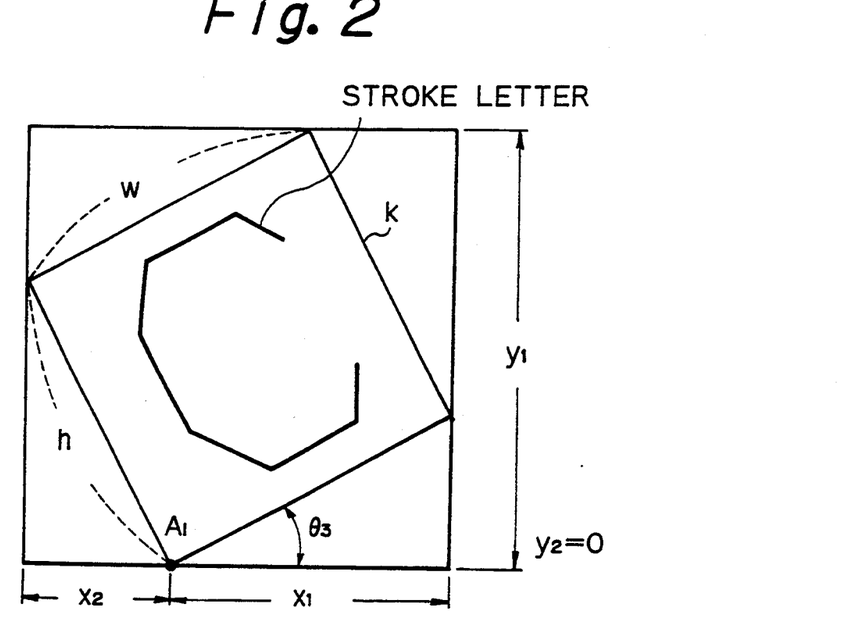
FIG. 2 is a drawing showing an example of a stroke letter in the present invention.

In FIG. 2, an example of a stroke letter SL is shown and an inclination angle $\theta_3$ to a horizontal line R ($y_2=0$) of a picture screen is represented by an expression $$\theta_3 = \theta_1 + \theta_2.$$

A displacement from the letter reference point $A_i$ when a stroke letter is inclined is defined as follows:

That is, an area of one letter surrounded by a rectangle k and when the rectangle k slants, $x_1$ is the largest displacement in the positive direction of X axis, $x_2$ is the largest displacement in the negative direction of X axis, $y_1$ is the largest displacement in the positive direction of y axis and $y_2$ is the largest displacement in the negative direction of Y axis. As shown in FIG. 2, the largest displacement $y_2$ in the negative direction of Y axis is equal to zero.

Figure 3:
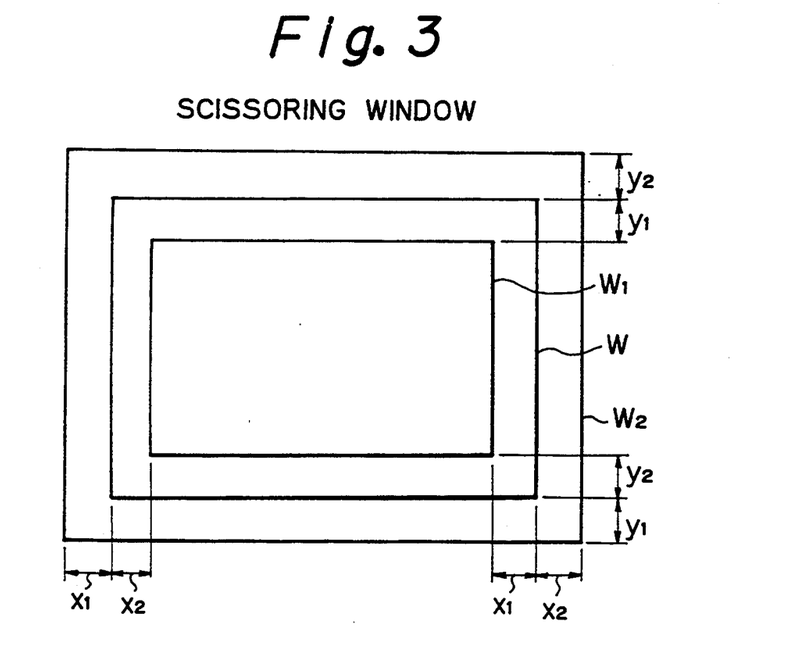
FIG. 3 is a schematic drawing showing a structure of an example of a scissoring window.
Figure 4A:
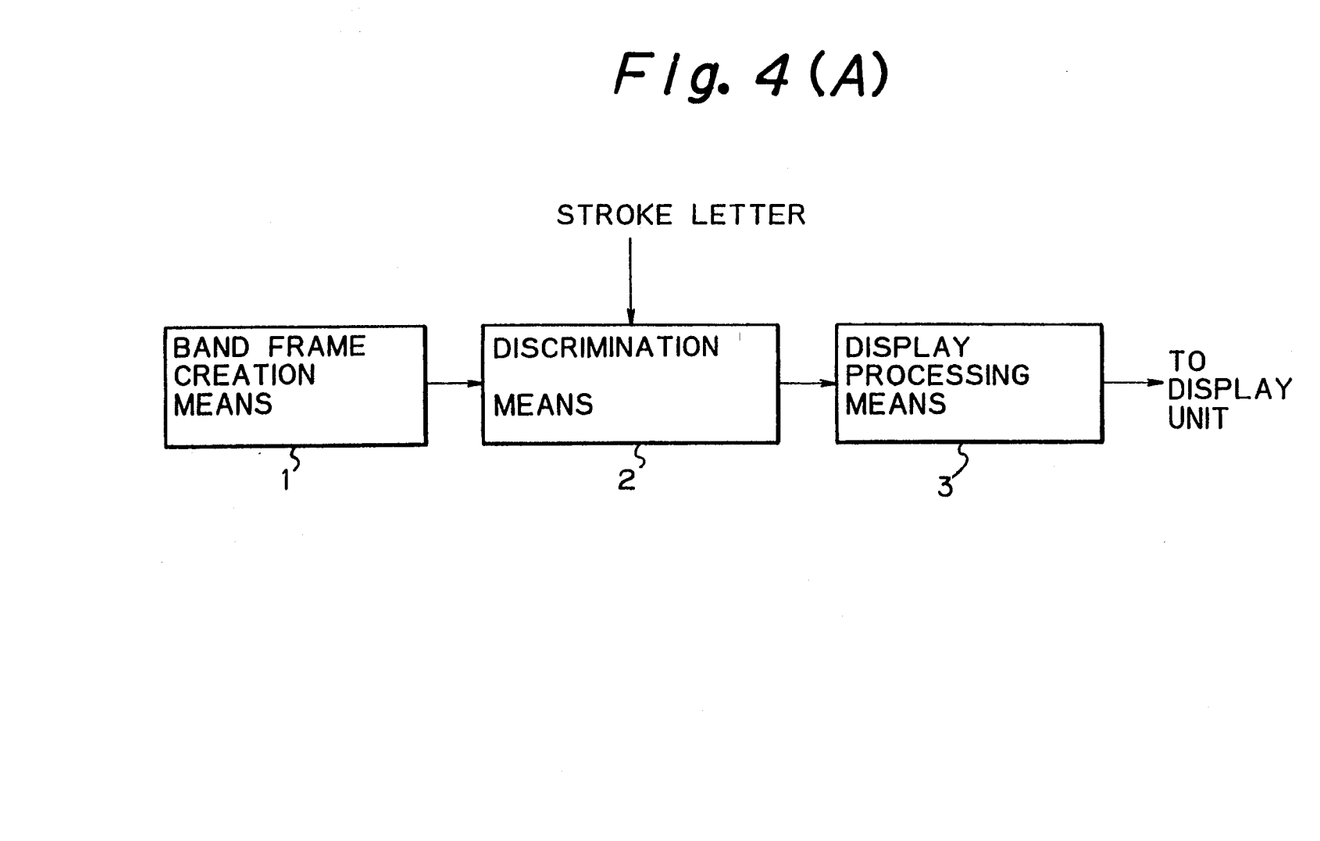
FIG. 4A is a block diagram showing a display system in accordance with the present invention.

In FIG. 3, a structure of a scissoring window is denoted, which is produced by a band frame creation means 1 (Refer to FIG. 4). In FIG. 3, W is an inherent scissoring window, on the inside of which a stroke letter is cut out for display. $W_1$ denotes a working window provided on the inside of the scissoring window W and $x_1$ and $y_2$ denote the above-described displacement, respectively. Also, $W_2$ is a working window provided on the outside of W and $x_2$, $y_1$ denote the above-described displacement. A band-like area surrounded by the working windows $W_1$ and $W_2$ is referred to as a band frame.

FIG. 4A is a functional block diagram of an embodiment in accordance with the present invention. In FIG. 4A, a display system is shown for cutting-out to display only a portion within a frame surrounded by a predetermined frame line among image information constituted by a series of stroke letters. The display system includes: a band frame creation means 1 for producing a band frame having a predetermined width on both sides of the frame line; a discrimination means 2 for determining whether or not a stroke letter exists on the outside of the band frame produced by the band frame generation means 1, on the band frame, or on the inside of the band frame, and a display processing means 3 for inhibiting a display when it is determined by the discrimination means 2 that the stroke letter is on the outside of the band frame, for allowing a display as it is when the stroke letter is on the inside of the band frame, and performing a scissoring processing to be displayed when it is determined that the stroke letter is on the band frame.

Figure 4B:
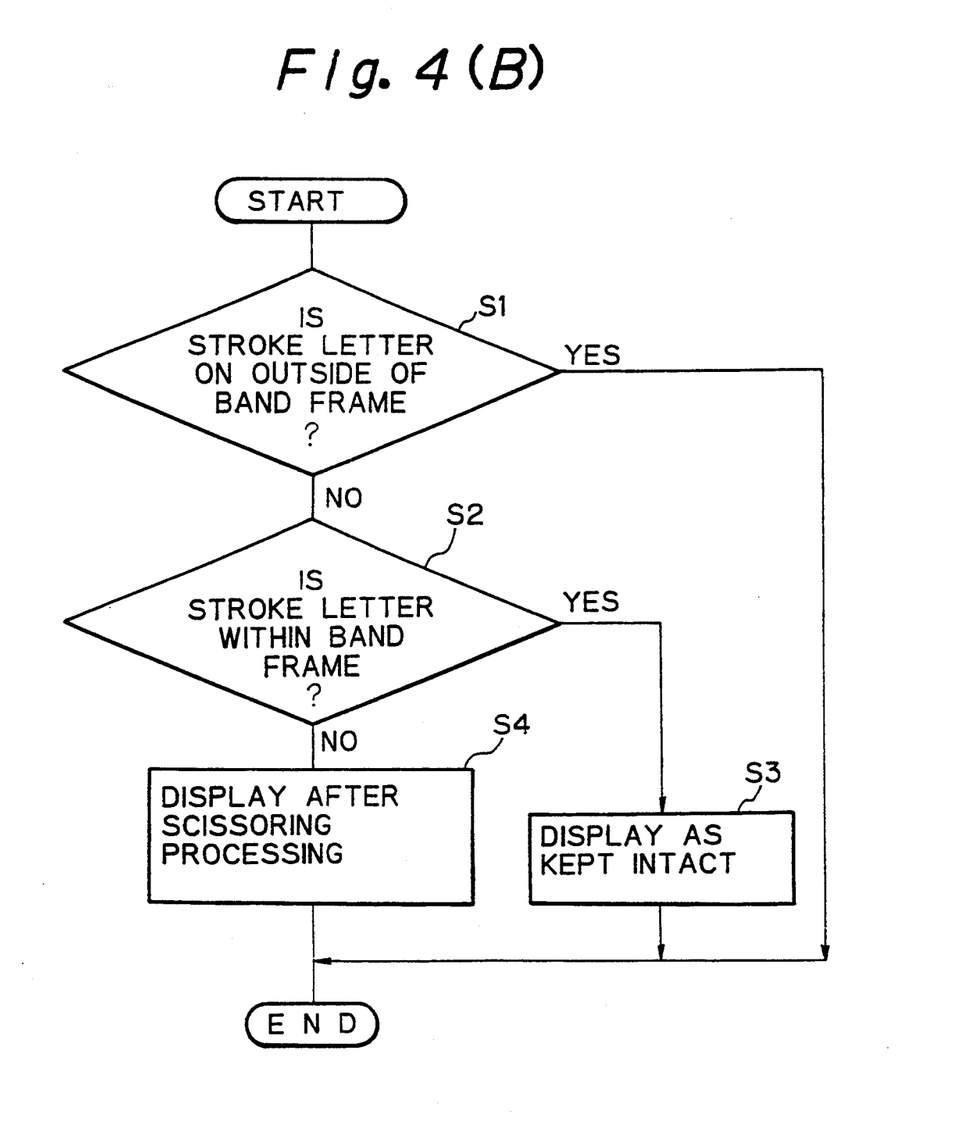
FIG. 4B is a flow chart of the operation in FIG. 4A.

FIG. 4B illustrates a flow chart of the operation of FIG. 4A. The mode of operation of FIG. 4A will be described as follows.

When a series of stroke letters are displayed within the frame surrounded by a predetermined frame line, a band frame is defined having a predetermined width on both sides of the frame line. Thereafter, as shown in FIG. 4B, it is checked whether or not a given stroke letter is on the outside of the band frame (Step S1). When it is determined that the stroke letter is on the outside of the band frame, a display is inhibited and the process terminates. When it is determined that the stroke letter is not on the outside of the band frame, it is checked whether or not the given stroke letter is on the inside of the band frame (Step S2) and when it is determined that it is on the inside of the band frame, the given stroke letter is displayed as it is (Step S3). When it is determined that it is not on the inside thereof, it is recognized that it is on the band frame and a scissoring processing is performed and displayed (Step S4).

From the above processes, since the scissoring processing is performed only on the stroke letters indispensable to performing a scissoring processing, it is able to perform very fast scissoring processing and the stroke letter can be displayed very quickly.

Figure 5:
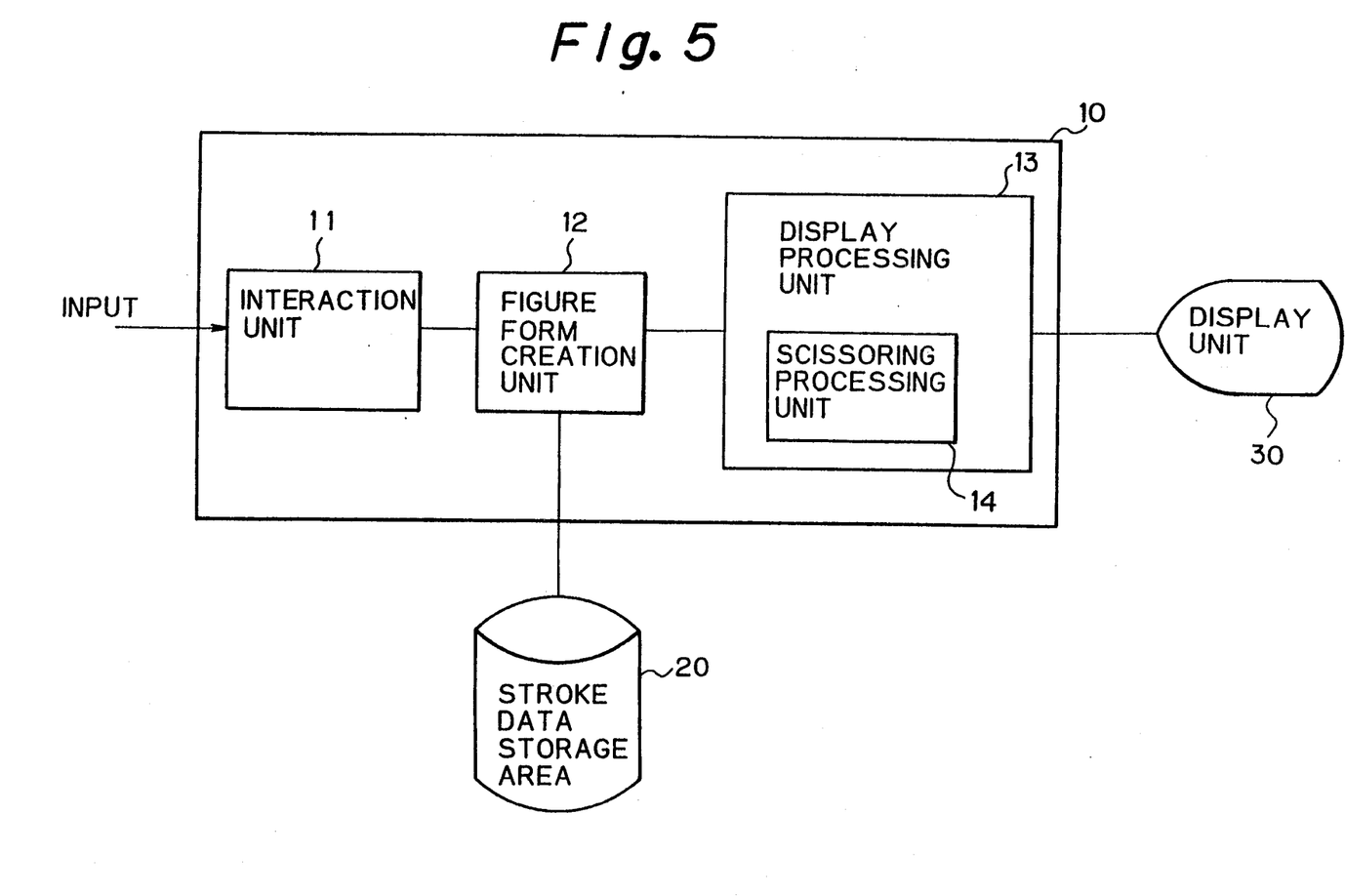
FIG. 5 is a block diagram showing the structure of a display system of an embodiment in accordance with the present invention.

FIG. 5 is a block diagram showing the structure of a display system of an embodiment in accordance with the present invention.

In FIG. 5, reference numeral 10 denotes a central processing unit (CPU) constituted by, for example, a microprocessor or the like. The central processing unit 10 includes an interaction unit 11, also called a conversational mode unit 11, a graphic figure form creation unit 12, and a display processing unit 13 that includes a scissoring processing unit 14.

The conversational mode unit 11 takes data supplied from an input device such as, for example, a keyboard or the like for interpretation and the data interpreted at the conversational mode unit 11 is supplied to the graphic form creation unit 12.

Based on data supplied from the conversational mode unit 11, the graphic form plotter unit 12 plots a graphic form represented by the stroke data and the letter is also created as stroke data. The stroke data plotted by the graphic figure form plotter unit 12 is supplied to a stroke data storage area 20 to be stored. A memory such as, for example, a magnetic disk device that can store data permanently is utilized as the stroke data storage area 20.

The stroke data created at the graphic figure form creation unit 12 is also supplied to the display processing unit 13. Thereby, while input data is being stored, it can be displayed.

The graphic figure form creation unit 12 reads the stroke data stored in the stroke data storage area 20 to deliver it to the display processing unit 13 and thereby it can display desired graphic forms or letters whenever the occasion arises.

The display processing unit 13 can carry out all kinds of processing for a graphic display, that is, scissoring processing in accordance with a feature of the present invention and multifarious processing on an image display. The operation of the scissoring processing unit 14 will be described hereinafter.

Figure 6A:
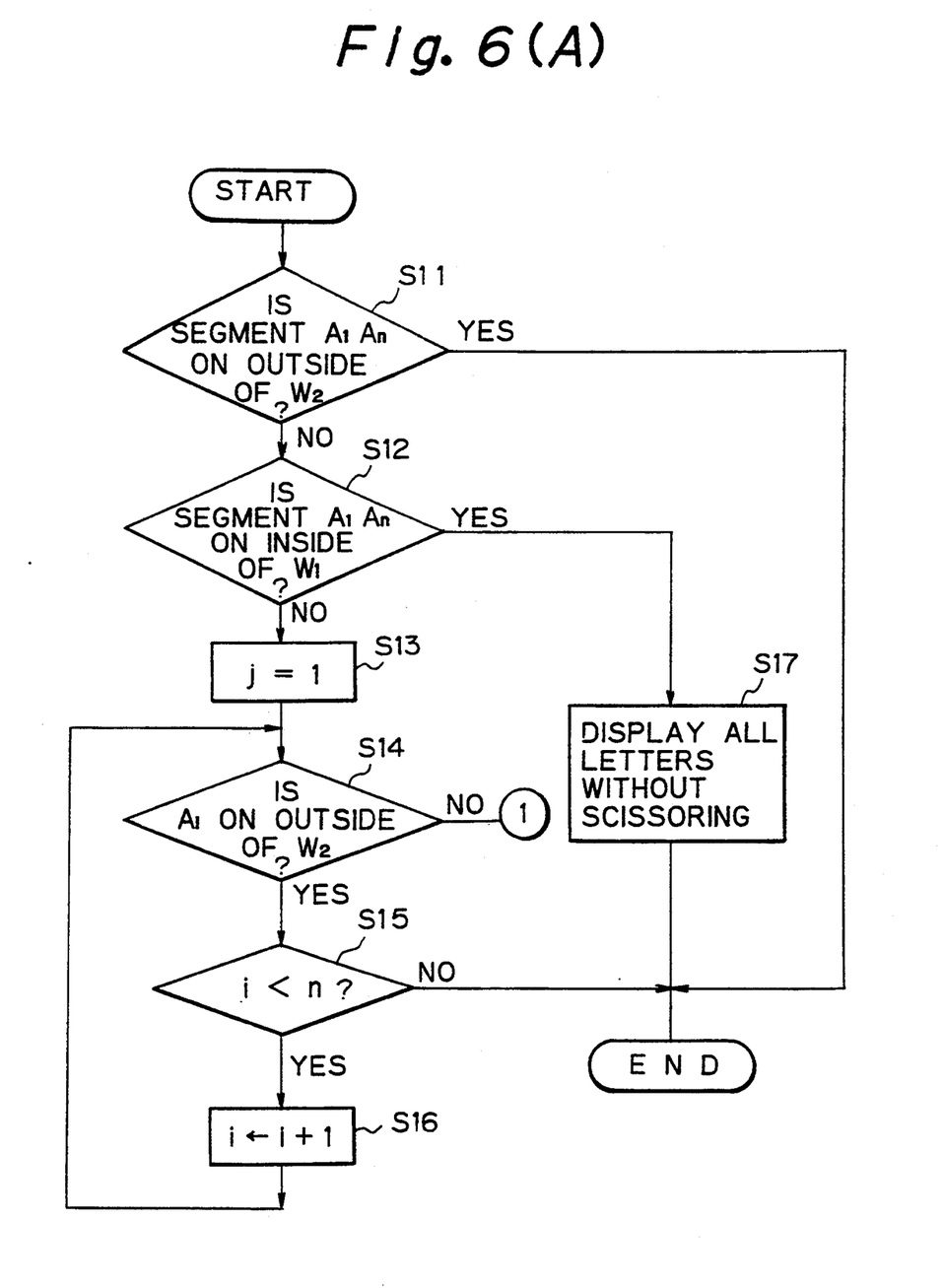
FIGS. 6A and 6B are a flow chart of the operation of FIG. 5.
Figure 6B:
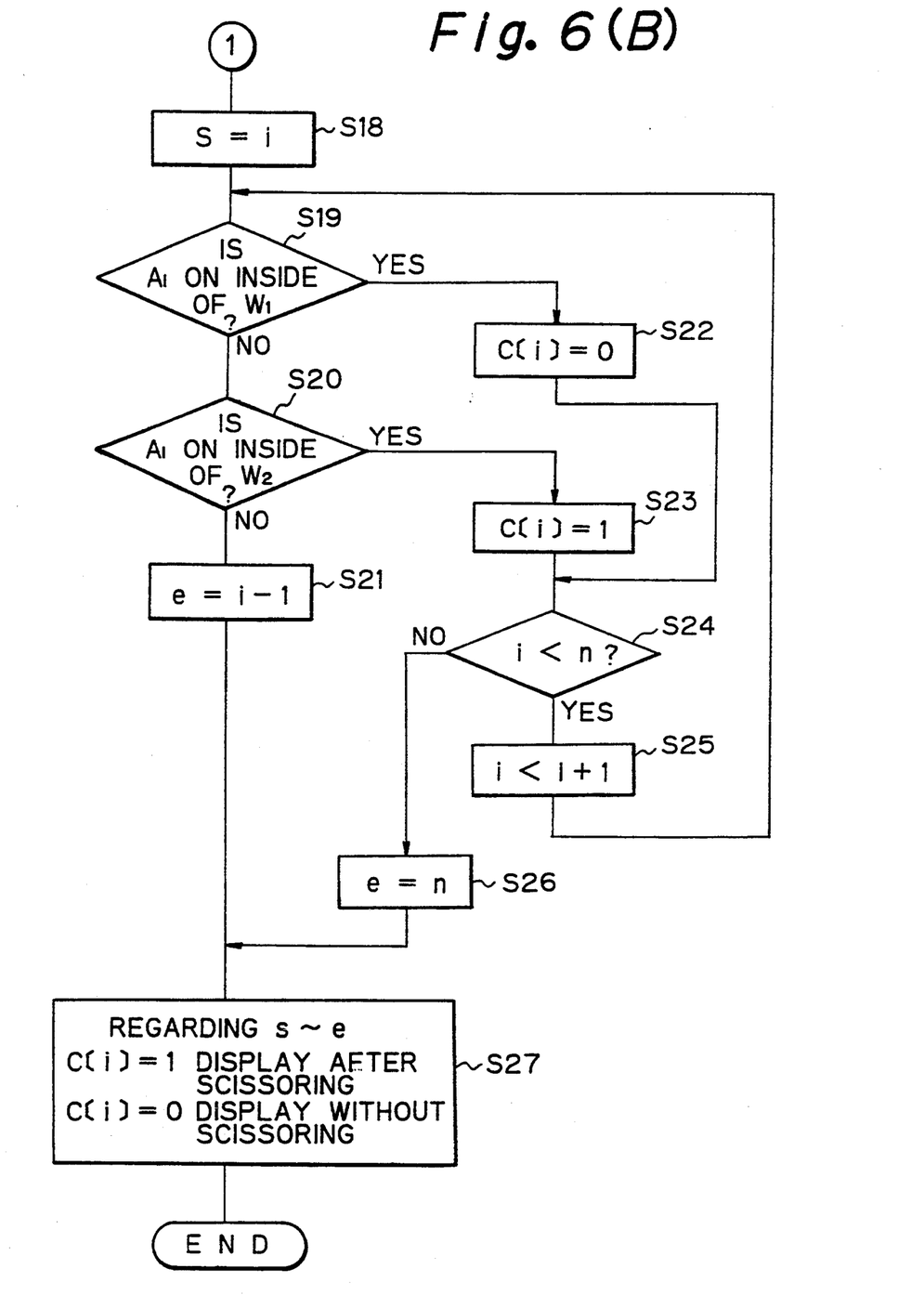

The flow chart of FIG. 6(A) is used to create a series of stroke letters and a scissoring window, as shown in FIGS. 1 to 3. The operation of scissoring processing of a series of stroke letters and a resulting display thereof will be described.

Whether or not a segment $A_1A_n$ combining each letter reference point $A_i$ of a series of input stroke letters on the outside of a window $W_2$, is checked (Step S11). When it is determined that the segment $A_1A_n$ is on the outside of $W_2$, from the state of the displacements $x_1$, $x_2$, $y_1$, and $y_2$ as shown in FIG. 3, it is determined that a series of letters is completely on the outside of the scissoring window W. Nothing is displayed on the screen, and the processing is terminated.

On the other hand, when it is determined that the segment $A_1A_n$ is not on the outside of the window $W_2$, it is checked whether or not the segment $A_1A_n$ is on the inside of the window $W_1$ (Step S12). If it is determined that the segment $A_1A_n$ is on the inside of the window $W_1$, from the state of the displacements $x_1$, $x_2$, $y_1$ and $y_2$ as shown in FIG. 3, it is recognized that a sequence of letters is completely on the inside of the scissoring window W. Scissoring processing with regard to all letters is not carried out, but all letters are displayed intact (Step S17), to terminate the processing.

In the above step S12, once it is determined that the segment $A_1A_n$ is not on the inside of the window $W_1$, each letter forming a series of stroke letter lines is checked to determine whether or not each letter is on the outside of the window W, on the inside of it, or whether or not each letter is laid across the outside and the inside of the window W, and based on the result of each check, either nothing is displayed on the screen, all letters are displayed intact, or the scissoring processing is carried out to display the result.

That is, first, a suffix i of a letter reference point $A_i$ is initialized to "1" (step S13). This means that the processing will be started from the letter reference point $A_1$ of the first letter of a series of stroke letters.

Next, it is checked whether or not the letter reference point $A_i$ is on the outside of the window $W_2$ (Step S14). Once it is determined that it is on the outside of the window $W_2$, since it is not necessary to carry out a display processing, it is checked whether or not i is smaller than n, that is, whether or not a processing up to the last letter of a series of letters (a letter having the letter reference point $A_n$) is carried out (Step S15). If "i<n", that is, if "i=n", it is determined that the processing has been completed up to the last letter, and a sequence of processing terminates.

On the other hand, if "i<n", i is incremented (Step S16), and after returning to step S14, the processing regarding the following letter is carried out and the same processing is repeated to loop back the process to step S14.

A series of processing from step S13 to step S16 is carried out to execute a function for neglecting a letter other than an objective of the display processing.

In the case of step S14 in the above loop procedure, when it is determined that the letter reference point $A_i$ is not on the outside of the window $W_2$, since there is a letter after the relevant letter which is in the intended display the display processing after scissoring processing and the intact display processing will be carried out hereinafter, as follows. A suffix i of the letter reference point $A_i$ at that time is stored as s (Step S18). The s denotes the first letter of an intend display.

Referring to FIG. 6A, the operation of an embodiment will be described.

It is determined whether or not the letter reference point $A_i$ is on the inside of the window $W_1$ (Step S19). Once it is determined that the letter reference point $A_i$ is on the inside of the window $W_1$, the relevant letter is identified as a letter to be displayed intact, that is, a letter other than an objective of scissoring and it is set to a state of C [i]=0 to be stored (Step S22).

On the other hand, if it is determined that the letter reference point $A_i$ is not on the inside of the window $W_1$, it is checked whether or not the letter reference point $A_i$ is on the inside of the window $W_2$ (Step S20). If the letter reference point $A_i$ is on the inside of the window $W_2$, it is determined that the letter is on the band frame surrounded by the windows $W_1$ and $W_2$ and the letter is ready for scissoring processing, and it is set to a state of C [i]=1 to be stored (Step S23).

In the above step S20, when the letter reference point $A_1$ is determined to be not on the inside of the window $W_2$, it is recognized that the relevant letter is on the outside of the window $W_2$ and it is not necessary to be displayed and a letter prior to it (a letter denoted by (i−1)) is stored as the last display processing objective letter e of an intended display (Step S21). Then, proceeding to step S27, a display processing is effected.

In the above step S22 or step S23, when a letter under processing at present is stored as a letter other than a letter ready for scissoring, i.e., an objective of scissoring or a scissoring objective letter, it is checked, thereafter, whether or not i is smaller than n, that is, whether or not the processing has been completed up to the last letter of a series of letters (a letter having the letter reference point $A_n$) (Step S24).

If "i<n", i is incremented (Step S25), returned back to step S19 to carry out the processing regarding the following letter, and so forth, and the same processing is repeated again to loop.

If "i=n", it is determined that the processing has been completed up to the last letter. The letter (denoted by i) is stored as the last display processing objective letter e of an intended or desired display (Step S26). Then, proceeding to step S27, display processing will be carried out.

A display processing in step S27 is carried out from the first display processing objective letter s stored in advance to the letter in the region up to the last display processing objective letter e. That is, if C [i]=0, the letter is displayed kept intact without scissoring-processing and if C [i]=1, the letter is displayed after scissoring-processing. In this case, i is deduced from the relation "$s \leq i \leq e$".

Since scissoring processing per se is well known, a detailed description will be omitted.

From the above embodiment, in consideration of an inclination of a letter and that of a series of letters, a series of letters formed by the stroke data is divided into the display processing objective letter and the other letters. The display processing objective letter is divided into the scissoring objective letter and the other letters to distinguish the scissoring objective letter therefrom. Since the scissoring processing is executed only regarding the scissoring objective letters, scissoring processing can be carried out very rapidly, therefore a display processing to the display unit can be carried out very rapidly.

In the above-described embodiment, a case where the stroke letter as a processing objective is inclined to the left is illustrated. It can also be applied to a case where the stroke letter is inclined to the right. In this case, if the position of the letter reference point $A_i$ is the same, the maximum displacement $y_2$ in the negative Y axis has a value other than zero.

I claim:

1. A method for carrying out scissoring processing of stroke letters in a window frame identifying a displaying frame in a display screen, the window frame being defined by a frame line, the method comprising the steps of:

defining an area around the stroke letter, said defined area having a height and width, a reference position and inclination angle;

defining a band frame around the frame line based on the length and width, the inclination angle and the reference position of the defined area, to determine a displacement area of the stroke letter such that the band frame has a width surrounding an outside of the frame line and a width surrounding an inside of the frame line so that the band frame is changed in response to a change in the inclination angle of the area;

determining whether the defined area of at least one of the stroke letters is on the outside of the band frame, within the band frame or on the inside of the band frame; and inhibiting the display of the stroke letter if the defined area of the stroke letter is on the outside of the band frame, displaying the stroke letter if the stroke letter is on the inside of the band frame, and carrying out a scissoring process if at least a portion of the stroke letter is within the band frame.

* * * * *

UNITED STATES PATENT AND TRADEMARK OFFICE
CERTIFICATE OF CORRECTION

PATENT NO. : 5,384,907
DATED : January 24, 1995
INVENTOR(S) : Arimatsu

It is certified that error appears in the above-indentified patent and that said Letters Patent is hereby corrected as shown below:

Column 2, line 62, delete "y" and insert --Y--.

Column 4, line 2, after "graphic" insert --figure--.

Column 5, line 6, delete "<" and insert --≮--.

Column 5, line 26, delete "intend" and insert --intended--

Signed and Sealed this

Third Day of October, 1995

Attest:

BRUCE LEHMAN

*Attesting Officer*       *Commissioner of Patents and Trademarks*